United States Patent
Kurihara (10) Patent No.: US 11,094,946 B2
(45) Date of Patent: Aug. 17, 2021

(54) FUEL CELL STACK AND METHOD OF MANUFACTURING FUEL CELL STACK

(71) Applicant: TOYOTA JIDOSHA KABUSHIKI KAISHA, Toyota (JP)

(72) Inventor: Takuya Kurihara, Miyoshi (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 255 days.

(21) Appl. No.: 16/286,136

(22) Filed: Feb. 26, 2019

(65) Prior Publication Data
US 2019/0326615 A1    Oct. 24, 2019

(30) Foreign Application Priority Data
Apr. 19, 2018 (JP) .............................. JP2018-080553

(51) Int. Cl.
| | | |
|---|---|---|
| *H01M 8/0273* | (2016.01) | |
| *H01M 8/2404* | (2016.01) | |
| *H01M 8/028* | (2016.01) | |
| *H01M 8/0247* | (2016.01) | |

(52) U.S. Cl.
CPC ......... *H01M 8/0273* (2013.01); *H01M 8/028* (2013.01); *H01M 8/0247* (2013.01); *H01M 8/2404* (2016.02)

(58) Field of Classification Search
None
See application file for complete search history.

(56) References Cited

U.S. PATENT DOCUMENTS
2017/0229716 A1    8/2017 Nonoyama

FOREIGN PATENT DOCUMENTS
| | | |
|---|---|---|
| JP | 2014120368 A | 6/2014 |
| JP | 2017139178 A | 8/2017 |

*Primary Examiner* — Sarah A. Slifka
(74) *Attorney, Agent, or Firm* — Dickinson Wright, PLLC (57) ABSTRACT

A fuel cell stack according to the present disclosure includes a collector configured to collect electric power generated by a plurality of fuel battery cells. The collector includes a structure in which the separator and the collector plate adhere to each other with a seal member interposed therebetween. A space formed by the collector plate, the separator, and the seal member is a closed space. The collector includes a ventilation structure for discharging gas from the closed space to the outside when a pressure in the closed space rises.

5 Claims, 12 Drawing Sheets

FUEL CELL STACK AND METHOD OF MANUFACTURING FUEL CELL STACK

CROSS REFERENCE TO RELATED APPLICATIONS

This application is based upon and claims the benefit of priority from Japanese patent application No. 2018-080553, filed on Apr. 19, 2018, the disclosure of which is incorporated herein in its entirety by reference.

BACKGROUND

The present disclosure relates to a fuel cell stack and a method of manufacturing a fuel cell stack.

The fuel cell stack is formed by stacking a plurality of fuel battery cells. Each fuel battery cell includes a pair of separators and a membrane electrode gas diffusion layer assembly disposed between the pair of separators. Further, a seal member is disposed around the membrane electrode gas diffusion layer assembly, and the pair of separators adheres to each other with the seal member interposed therebetween.

Japanese Unexamined Patent Application Publication No. 2014-120368 discloses a fuel battery cell in which a pair of separators adheres to each other with a seal member interposed therebetween.

SUMMARY

As described in the background, a fuel cell stack is composed of a plurality of stacked fuel battery cells. A collector for collecting electric power generated by the fuel battery cells is provided at an end part of each fuel cell in a stacking direction. The collector may be formed by the separator adhering to a collector plate with a seal member interposed therebetween. When the collector is formed by the separator adhering to the collector plate with the seal member interposed therebetween in this manner, a space formed by the collector plate, the separator, and the seal member becomes a closed space.

However, when a closed space is present inside the collector, the temperature of the collector rises when the fuel cell stack is operated, and the pressure in the closed space rises due to this temperature rise. When the pressure in the closed space rises in this way, the seal member sealing the collector may be peeled off, which may cause gas or a cooling medium to leak.

In view of the above problem, an object of the present disclosure is to provide a fuel cell stack capable of effectively preventing a seal member sealing a collector from being peeled off, and a method of manufacturing a fuel cell stack.

An example aspect of the present disclosure is a fuel cell stack composed of a plurality of fuel battery cells stacked in a stacking direction. The fuel cell stack includes a collector provided at an end part of the fuel battery cells in the stacking direction and configured to collect electric power generated by the fuel battery cells. The collector includes a structure in which a separator and a collector plate adhere to each other with a seal member interposed therebetween. A space formed by the collector plate, the separator, and the seal member is a closed space. The collector includes a ventilation structure for discharging gas from the closed space to the outside when a pressure in the closed space rises.

In the fuel cell stack according to the present disclosure, the ventilation structure for discharging gas from the closed space to the outside when a pressure in the closed space formed in the collector rises is formed. The ventilation structure formed in this way enables gas to be discharged from the closed space to the outside when the temperature of the collector rises while the fuel cell stack is operated. This effectively prevents the pressure in the closed space from rising, thereby effectively preventing the seal member sealing the collector from being peeled off.

In the above fuel cell stack, the ventilation structure may be formed by providing a non-adhesion part where a part of the separator does not adhere to the seal member. Alternatively, the ventilation structure may be formed by providing a ventilation hole in a part of the seal member. With such a configuration, the ventilation structure can be easily formed in the collector.

In the above fuel cell stack, a thickness adjusting plate for electrically connecting the separator to the collector plate may be provided between the separator and the collector plate. The thickness adjusting plate provided in this way enables the separator to be electrically connected to the collector plate.

In the above fuel cell stack, the collector plate may include a protrusion protruding to be brought into contact with the separator in the stacking direction. When the protrusion is provided in the collector plate in this way, it is not necessary to provide the above thickness adjusting plate, thereby reducing the number of parts. This further eliminates the need for positioning at the time of disposing the thickness adjusting plate between the separator and the collector plate, which simplifies the manufacturing process.

In the above fuel cell stack, the collector may have a rectangular shape, and a communication hole through which anode gas and cathode gas pass through may be provided in each of both end parts of the collector in a longitudinal direction, and the ventilation structure may be formed at a part of a side extending in the longitudinal direction of the collector. It is preferable that the ventilation structure be formed at such a position, because there is a larger space at the side of the collector extending in the longitudinal direction than at the both end parts of the collector in the longitudinal direction.

An example aspect of the present disclosure is a method of manufacturing a fuel cell stack including: disposing a seal member between a separator and a collector plate; and sandwiching the separator and the collector plate between a first die and a second die and thermocompression-bonding the separator to the collector with the seal member interposed therebetween. The collector plate, the separator, and the seal member form a closed space. By providing a region where the separator and the seal member are not thermocompression-bonded to each other in the thermocompression-bonding, a ventilation structure for discharging gas from the closed space to the outside when a pressure in the closed space rises is formed.

In the method of manufacturing a fuel cell stack according to the present disclosure, the ventilation structure for discharging gas from the closed space to the outside when the pressure in the closed space formed in the collector rises is formed. The ventilation structure formed in this way enables gas to be discharged from the closed space to the outside when the temperature of the collector rises while the fuel cell stack is operated. This effectively prevents the pressure in the closed space from rising, thereby effectively preventing the seal member sealing the collector from being peeled off.

In the above method of manufacturing a fuel cell stack, the region where the separator and the seal member are not thermocompression-bonded to each other may be formed by providing a region where the first die is not brought into contact with the separator. Further, the region where the separator and the seal member are not thermocompression-bonded to each other may be formed by applying a non-adhesion treatment to at least one of the seal member and the separator. The ventilation structure can be easily formed in the collector using such a method.

According to the present disclosure, it is possible to provide a fuel cell stack capable of effectively preventing a seal member sealing a collector from being peeled off, and a method of manufacturing a fuel cell stack.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, an embodiment will be described with reference to the drawings.

Figure 1:
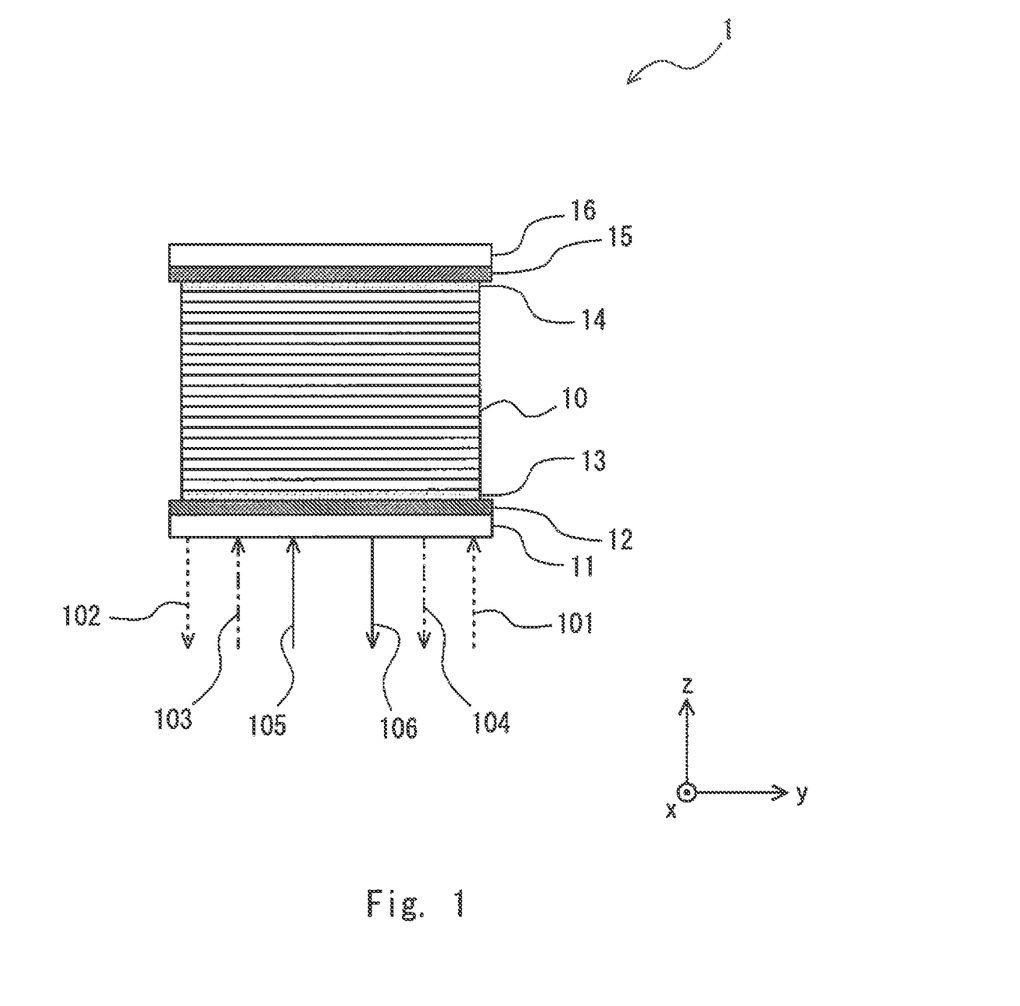
FIG. 1 is a view for describing a fuel cell stack according to an embodiment.

FIG. 1 is a view for describing a fuel cell stack according to the embodiment. As shown in FIG. 1, a fuel cell stack 1 includes a plurality of fuel battery cells 10, end plates 11 and 16, insulating plates 12 and 15, and collectors 13 and 14. These members are stacked in a z-axis direction in order of the end plate 11, the insulating plate 12, the collector 13, the plurality of fuel battery cells 10, the collector 14, the insulating plate 15, and the end plate 16.

Anode gas is supplied to the fuel cell stack 1 through a pipe 101. For example, the anode gas is hydrogen gas. The anode gas supplied to the fuel cell stack 1 is supplied to the plurality of fuel battery cells 10. Then, the anode gas not used in the fuel battery cells 10 is discharged through a pipe 102.

Cathode gas is supplied to the fuel cell stack 1 through a pipe 103. The cathode gas is, for example, oxygen (air). The cathode gas supplied to the fuel cell stack 1 is supplied to the plurality of fuel battery cells 10. Then, the cathode gas not used in the fuel battery cells 10 is discharged through a pipe 104.

Further, a cooling medium for cooling each fuel battery cell 10 is supplied to the fuel cell stack 1 through a pipe 105. For example, water can be used as the cooling medium. The cooling medium having passed through each fuel battery cell 10 is discharged through a pipe 106. For example, a pump (not shown) is provided between the pipe 105 and the pipe 106. By using this pump, the cooling medium can be circulated through the pipe 105, the fuel cell stack 1, the pipe 106, and the pump (not shown) in this order.

Figure 2:
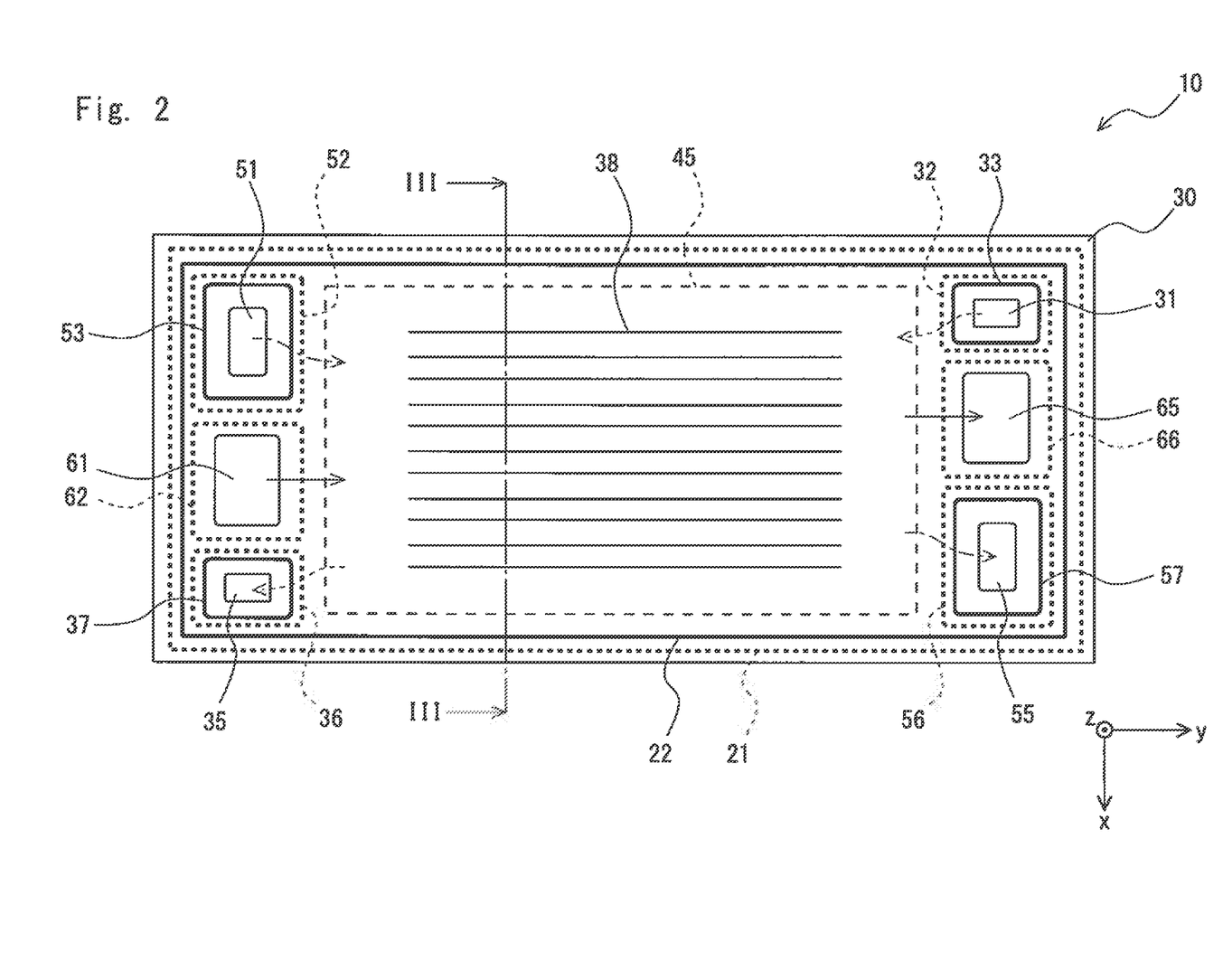
FIG. 2 is a plan view of a fuel battery cell included in a fuel cell stack according to the embodiment.
Figure 3:
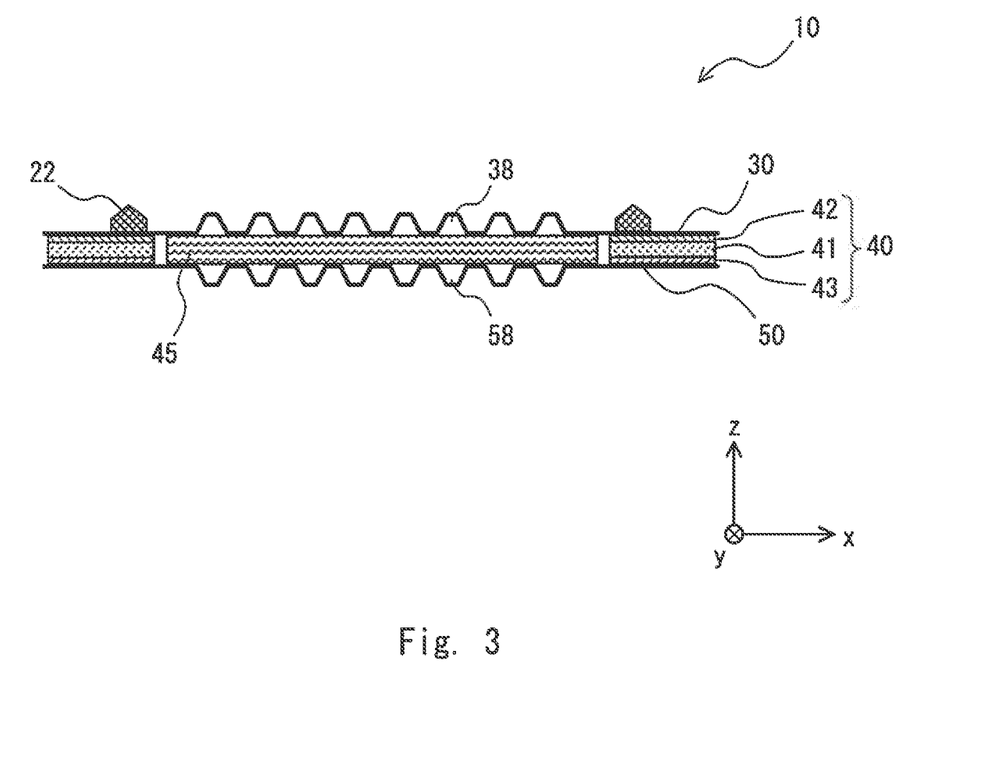
FIG. 3 is a cross-sectional view of a fuel battery cell included in the fuel cell stack according to the embodiment.

FIG. 2 is a plan view of the fuel battery cell (a single cell) constituting the fuel cell stack according to this embodiment. FIG. 3 is a cross-sectional view taken along the line III-III of the fuel battery cell 10 shown in FIG. 2. As shown in FIG. 3, in the fuel battery cell 10, an anode side separator 30 and a cathode side separator 50 adhere to each other with a seal member 40 interposed therebetween. The anode side separator 30 and the cathode side separator 50 may be made of a metal material such as titanium.

As shown in FIG. 2, the fuel battery cell 10 has a rectangular shape, and communication holes 31, 35, 51, 55, 61, and 65 are formed at both end parts of the fuel battery cell 10 in a longitudinal direction. For example, the communication hole 31 is an anode gas supply communication hole, the communication hole 35 is an anode gas discharge communication hole, the communication hole 51 is a cathode gas supply communication hole, the communication hole 55 is a cathode gas discharge communication hole, the communication hole 61 is a cooling medium supply communication hole, and the communication hole 65 is a cooling medium discharge communication hole.

When the plurality of fuel battery cells 10 are stacked, the communication holes 31, 51, and 61 function as flow paths (flow paths extending in the z-axis direction) for supplying the anode gas, the cathode gas, and the cooling medium, respectively, to each fuel battery cell 10. Moreover, when the plurality of fuel battery cells 10 are stacked, the communication holes 35, 55, and 65 function as flow paths (flow paths extending in the z-axis direction) for discharging the unused anode gas and cathode gas and the used cooling medium, respectively, from each fuel battery cell 10.

Gaskets 33, 37, 53, and 57 are provided around the respective communication holes 31, 35, 51, and 55. When the gaskets 33, 37, 53, and 57 are provided, the respective communication holes 31, 35, 51, and 55 are sealed between adjacent fuel battery cells 10. Further, the anode side separator 30 and the cathode side separator 50 adhere to each other with the seal member 40 interposed therebetween in seal regions 32, 36, 52, 56, 62, and 66 around the respective communication holes 31, 35, 51, 55, 61, and 65. Then, the peripheries of the respective communication holes 31, 35, 51, 55, 61, and 65 (excluding the flow paths for the anode gas and the cathode gas in the fuel battery cell 10) are sealed in the fuel battery cell 10.

A gasket 22 is provided to surround each of the communication holes 31, 35, 51, 55, 61, and 65 on the surface of the anode side separator 30. Further, the anode side separator 30 and the cathode side separator 50 adhere to each other with the seal member 40 interposed therebetween in a seal region 21 around the gasket 22 (see FIG. 3).

No gasket is provided around the communication holes 61 and 65 on the surface of the anode side separator 30 shown in FIG. 2, because the cooling medium flows between the fuel battery cells 10.

A Membrane Electrode Gas Diffusion Layer Assembly (MEGA) 45 sandwiched between the anode side separator 30 and the cathode side separator 50 is provided at the center of the fuel battery cell 10 shown in FIGS. 2 and 3. The MEGA 45 includes a membrane electrode assembly in which electrodes are disposed on both sides of an electrolyte membrane and gas diffusion layers disposed on both sides of the membrane electrode assembly. The MEGA 45 functions as a power generation module.

The anode gas supplied from the communication hole 31 flows through an anode gas flow path 38, a part of the anode gas is supplied to the MEGA 45, and remaining gas is discharged from the communication hole 35. Further, the cathode gas supplied from the communication hole 51 flows through a cathode gas flow path 58 (see FIG. 3), a part of the cathode gas is supplied to the MEGA 45, and remaining gas is discharged from the communication hole 55. In this way, electric power is generated by supplying the anode gas and the cathode gas to the MEGA 45.

As shown in FIG. 3, the anode side separator 30 and the cathode side separator 50 adhere to each other with the seal member 40 interposed therebetween. The seal member 40 has a three-layer structure and includes a core layer 41, an adhesive layer 42, and an adhesive layer 43. The core layer 41 is configured to be thicker than the adhesive layers 42 and 43. Thus, the core layer 41 is harder than the adhesive layers 42 and 43. For example, the core layer 41 can be formed using a thermoplastic resin such as polyethylene naphthalate (PEN).

The adhesive layers 42 and 43 are made of a material that adheres to the separator when a pressure is applied to them while the adhesive layers 42 and 43 are being heated (thermocompression bonding). That is, the adhesive layers 42 and 43 melt by heat, and then adhere to the separator. For example, the adhesive layers 42 and 43 can be formed using a thermoplastic resin such as polypropylene. The adhesive layer 42 adheres to the anode side separator 30, and the adhesive layer 43 adheres to the cathode side separator 50.

The gasket 22 is provided on the surface of the anode side separator 30. The gasket 22 seals spaces between the fuel battery cells 10 when the fuel battery cells 10 are stacked.

In the above descriptions, the positive side in the z-axis direction of each fuel battery cell 10 is defined as the anode side, and the negative side in the z-axis direction is defined as the cathode side. Alternatively, in this embodiment, the positive side in the z-axis side may be defined as the cathode side, and the negative side in the z-axis direction may be defined as the anode side. In this case, "anode" and "cathode" of each component are reversed. In the following descriptions, the anode side separator 30 and the cathode side separator 50 are simply referred to as the separators 30 and 50, respectively.

As shown in FIG. 1, the collectors 13 and 14 are provided at end parts of each fuel battery cell 10 in the stacking direction. The collectors 13 and 14 collect the electric power generated by each fuel battery cell 10 and output the electric power to the outside through terminals (not shown). Hereinafter, the collector 13 will be described in detail.

Figure 4:
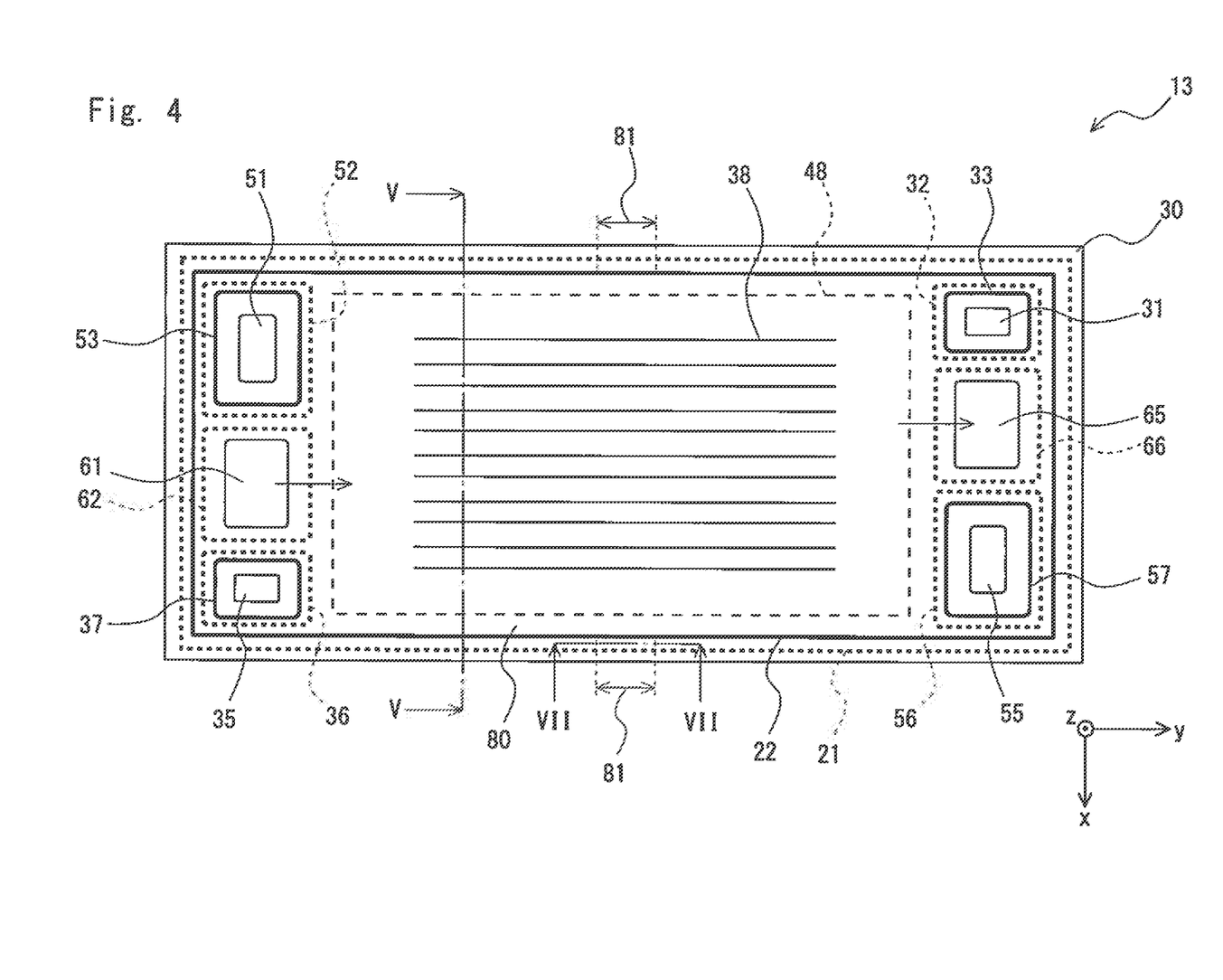
FIG. 4 is a plan view of a collector included in the fuel cell stack according to the embodiment.
Figure 5:
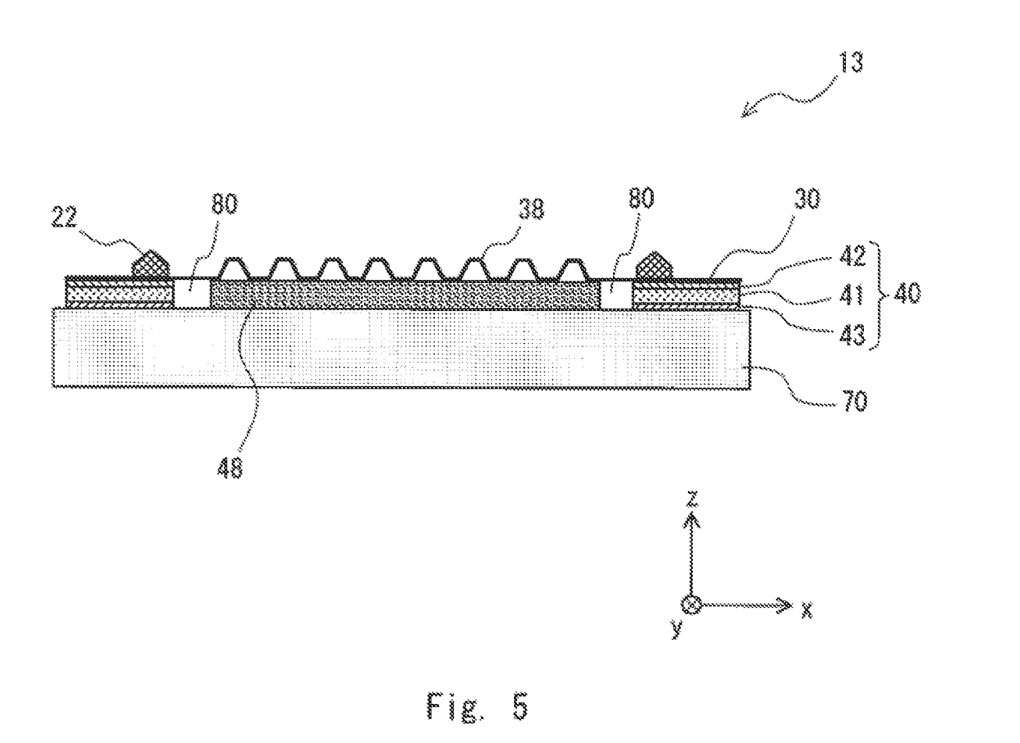
FIG. 5 is a cross-sectional view of the collector included in the fuel cell stack according to the embodiment.

FIG. 4 is a plan view of the collector 13 of the fuel cell stack according to this embodiment. FIG. 5 is a cross-sectional view of the collector 13 shown in FIG. 4 taken along the line V-V. As shown in FIG. 5, the collector 13 is configured in such a way that the separator 30 and a collector plate 70 adhere to each other with the seal member 40 interposed therebetween. The collector plate 70 is made of a metal material.

FIGS. 3 and 5 are compared below. In the fuel battery cell 10 shown in FIG. 3, the separator 30 and the separator 50 adhere to each other with the seal member 40 interposed therebetween, whereas in the collector 13 shown in FIG. 5, the separator 30 and the collector plate 70 adhere to each other with the seal member 40 interposed therebetween. That is, when the fuel battery cell 10 and the collector 13 are formed, the separator 30 and the seal member 40 can be used as common components.

As shown in FIG. 4, the collector 13 has a rectangular shape, and the communication holes 31, 35, 51, 55, 61, and 65 are formed at both end parts of the collector 13 in the longitudinal direction. For example, the communication hole 31 is an anode gas supply communication hole, the communication hole 35 is an anode gas discharge communication hole, the communication hole 51 is a cathode gas supply communication hole, the communication hole 55 is a cathode gas discharge communication hole, the communication hole 61 is a cooling medium supply communication hole, and the communication hole 65 is a cooling medium discharge communication hole. Each of the communication holes 31, 35, 51, 55, 61, and 65 is formed to penetrate through the separator 30 and the collector plate 70. Each of the communication holes 31, 35, 51, 55, 61, and 65 formed in the collector 13 is connected to each of the communication holes 31, 35, 51, 55, 61, and 65 formed in the fuel battery cell 10 shown in FIG. 2, respectively.

Gaskets 33, 37, 53, and 57 are provided around the respective communication holes 31, 35, 51, and 55. When the gaskets 33, 37, 53, and 57 are provided, the respective communication holes 31, 35, 51, and 55 are sealed between adjacent fuel battery cells 10. Further, the separator 30 and the collector plate 70 adhere to each other with the seal member 40 interposed therebetween in the seal regions 32, 36, 52, 56, 62, and 66 around the respective communication holes 31, 35, 51, 55, 61, and 65. Then, the peripheries of the communication holes 31, 35, 51, 55, 61, and 65 are sealed in the collector 13.

A gasket 22 is provided to surround each of the communication holes 31, 35, 51, 55, 61, and 65 on the surface of the separator 30. Further, the separator 30 and the collector plate 70 adhere to each other with the seal member 40 interposed therebetween in a seal region 21 around the gasket 22 (see FIG. 5).

When the collector 13 and the fuel battery cell 10 are stacked, the cooling medium flows from the communication hole 61 to the communication hole 65. A flow path 38 for the cooling medium is formed on the surface of the separator 30.

As shown in FIG. 5, the separator 30 and the collector plate 70 adhere to each other with the seal member 40 interposed therebetween. Like the fuel battery cell 10 (see FIG. 3), the seal member 40 has a three-layer structure, and includes a core layer 41, an adhesive layer 42, and an adhesive layer 43. The core layer 41 is configured to be thicker than the adhesive layers 42 and 43. Thus, the core layer 41 is harder than the adhesive layers 42 and 43. For example, the core layer 41 can be formed using a thermoplastic resin such as polyethylene naphthalate (PEN).

The adhesive layers 42 and 43 are made of a material that adheres to the separator 30 and the collector plate 70 when a pressure is applied to them while the adhesive layers 42 and 43 are being heated (thermocompression bonding). That is, the adhesive layers 42 and 43 melt by being heated, and then adhere to the separator 30 and the collector plate 70. For example, the adhesive layers 42 and 43 can be formed using a thermoplastic resin such as polypropylene. The adhesive layer 42 adheres to the anode side separator 30, and the adhesive layer 43 adheres to the collector plate 70.

A thickness adjusting plate 48 for electrically connecting the separator 30 to the collector plate 70 is provided between the separator 30 and the collector plate 70. The thickness adjusting plate 48 can be made of, for example, a metal material.

Figure 6:
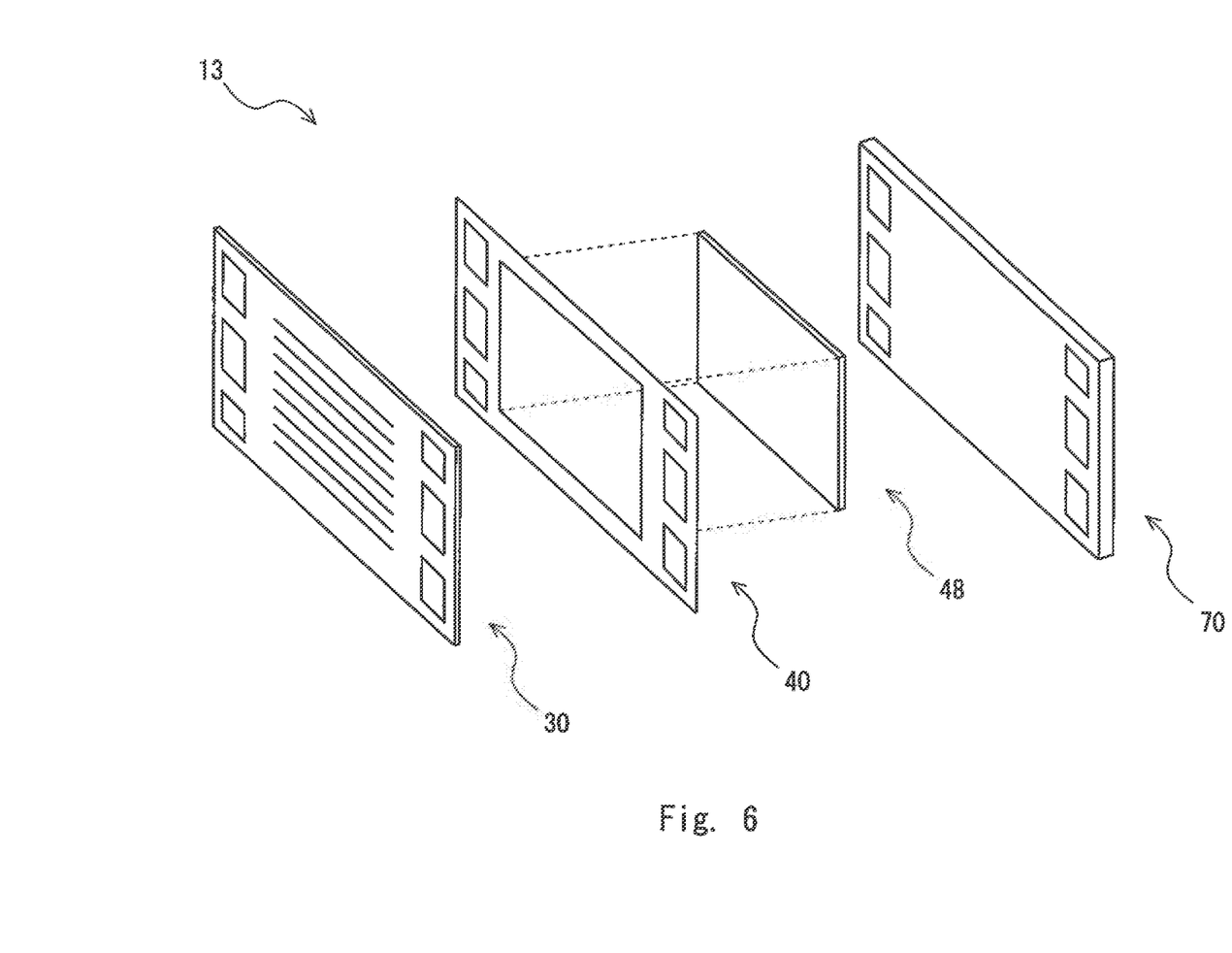
FIG. 6 is an exploded perspective view of the collector included in the fuel cell stack according to the embodiment.

As shown in the exploded perspective view of FIG. 6, when the collector 13 is formed, the seal member 40 is disposed between the separator 30 and the collector plate 70. The thickness adjusting plate 48 is disposed at the center of the seal member 40. After that, the separator 30 and the collector plate 70 are sandwiched between dies, and the separator 30 and the adhesive layer 42 are thermocompression-bonded to each other, and the collector plate 70 and the adhesive layer 43 are thermocompression-bonded to each other.

Since the anode gas and the cathode gas do not flow inside the collector plate 70, spaces formed by the separator 30, the collector plate 70, and the seal member 40 become closed spaces 80 (sealed spaces) as shown in FIG. 5.

In this way, when closed spaces 80 are present inside the collector 13, the temperature of the collector 13 rises when the fuel cell stack is operated, and the pressures in the closed spaces 80 rise due to this temperature rise. When the pressure in the closed space 80 rises in this way, the seal member 40 sealing the collector 13 may be peeled off, which may cause gas or a cooling medium to leak.

In order to address such a problem, as shown in FIG. 4, the fuel cell stack according to this embodiment has a ventilation structure 81 for discharging gas to the outside from the closed spaces 80 when the pressures in the closed spaces 80 formed in the collector 13 rise. The ventilation structure 81 formed in this way enables the gas to be discharged from the closed spaces 80 to the outside when the temperature of the collector 13 rises while the fuel cell stack is operated, and thus the pressures in the closed spaces 80 rise. This effectively prevents the pressures in the closed spaces 80 from rising, thereby effectively preventing the seal member from being peeled off, and thus the gas and cooling medium from leaking.

In the example shown in FIG. 4, the ventilation structure 81 is formed at a part of a side of the collector 13 extending in the longitudinal direction (the y-axis direction). Specifically, the ventilation structure 81 is formed on each of two sides of the collector 13 extending in the longitudinal direction (the y-axis direction). As shown in FIG. 4, the communication holes 31, 35, 51, 55, 61, and 65 are densely formed at the end parts of the collector 13 in the longitudinal direction (the y-axis direction). Thus, it is preferable that the ventilation structure 81 be formed on the side of the collector 13 extending in the longitudinal direction (the y-axis direction) where it is comparatively spacious. The location and the number of the ventilation structure to be formed can be determined as appropriate.

Figure 7:
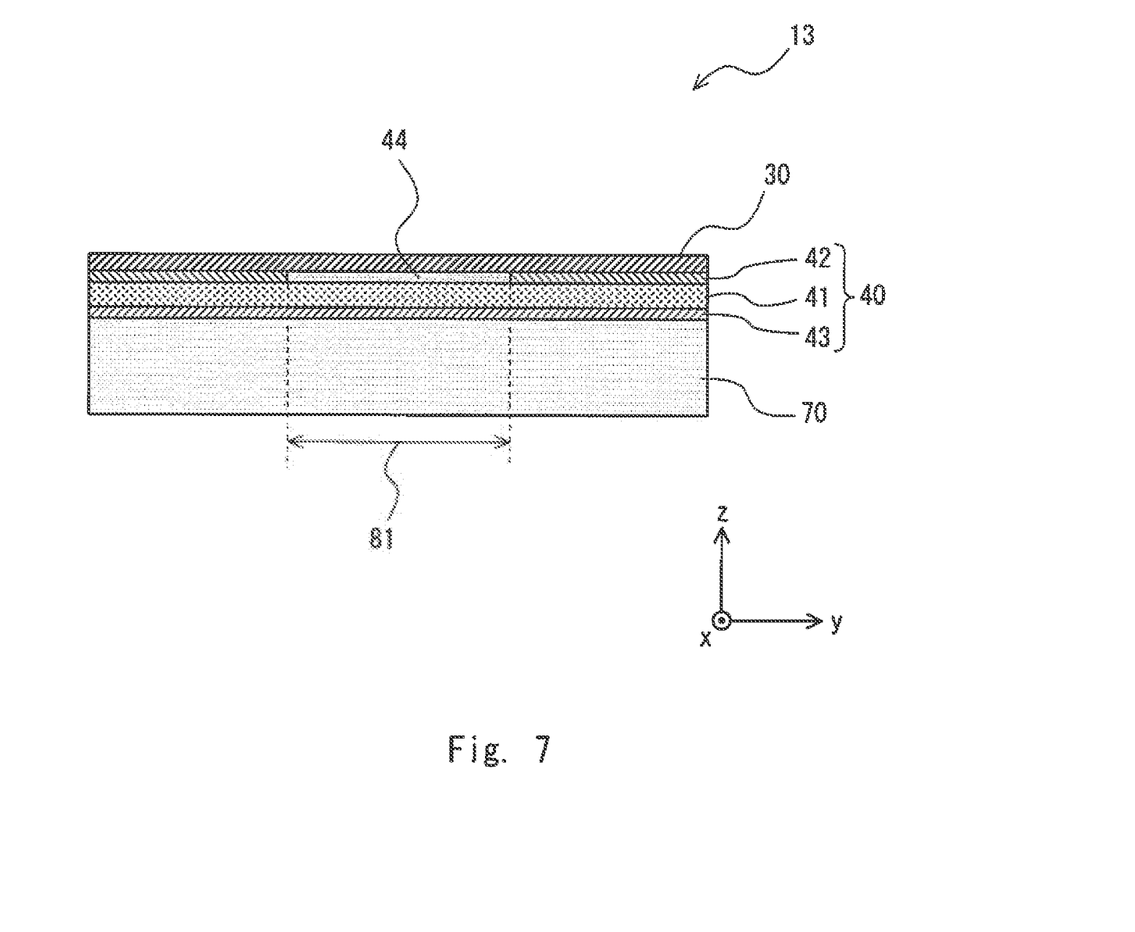
FIG. 7 is a cross-sectional view of the collector included in the fuel cell stack according to the embodiment.
Figure 8:
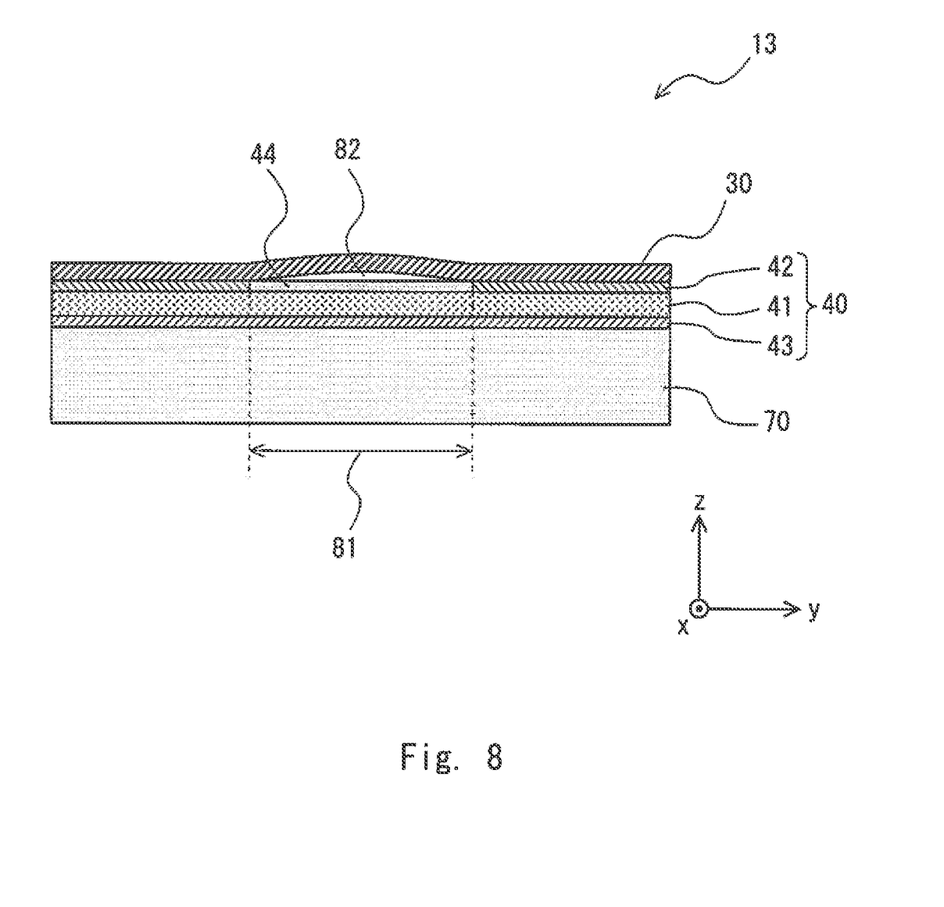
FIG. 8 is a cross-sectional view of the collector included in the fuel cell stack according to the embodiment.

FIG. 7 is a cross-sectional view of the collector 13 shown in FIG. 4 taken along the line VII-VII, and is a cross-sectional view showing the vicinity of the place where the ventilation structure 81 is formed. As shown in FIG. 7, the ventilation structure 81 can be formed by providing a non-adhesion part 44 where a part of the separator 30 does not adhere to the seal member 40. That is, as shown in FIG. 7, the non-adhesion part 44 where the adhesive layer 42 and the separator 30 do not adhere to each other is provided at a part of the adhesive layer 42. As shown in FIG. 8, the non-adhesion part 44 provided in this manner enables a ventilation hole 82 to be formed between the separator 30 and the seal member 40 when the pressures in the closed spaces 80 rise. The gas can be discharged from the closed spaces 80 to the outside through this ventilation hole 82.

Figure 9:
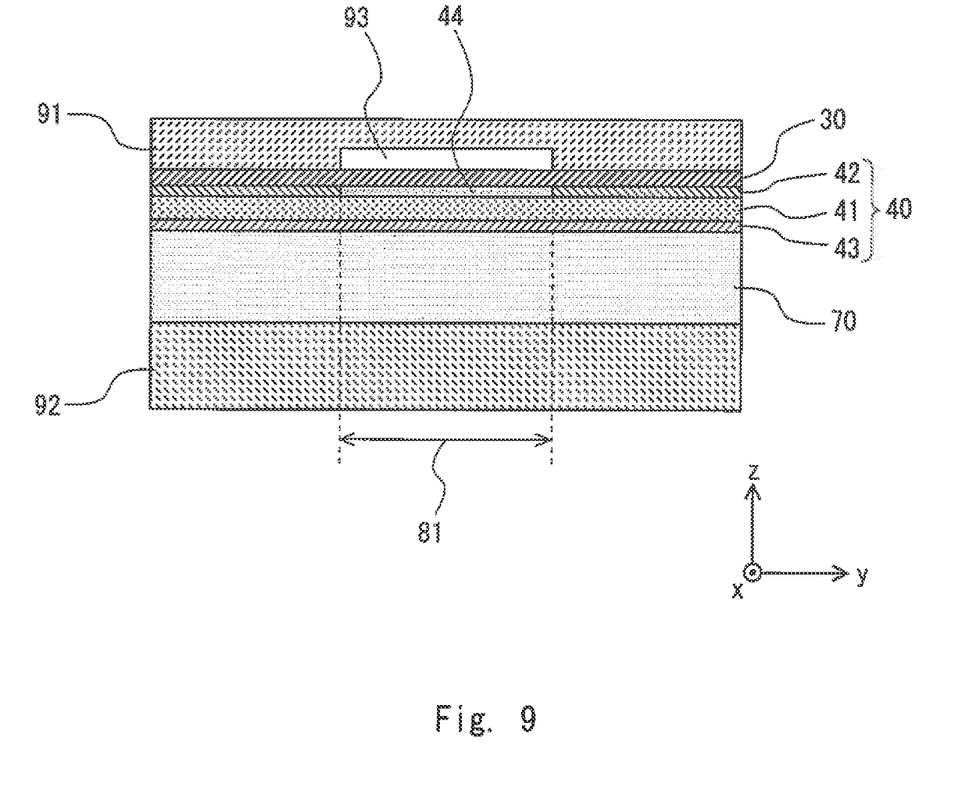
FIG. 9 is a cross-sectional view for describing a method of manufacturing the collector included in the fuel cell stack according to the embodiment.

For example, the non-adhesion part 44 can be formed as described below. FIG. 9 is a cross-sectional view for describing a method of manufacturing the collector included in the fuel cell stack according to this embodiment. As described above, when the collector 13 is formed, the seal member 40 is disposed between the separator 30 and the collector plate 70 (see FIG. 6). After that, as shown in FIG. 9, the separator 30 and the collector plate 70 are sandwiched between dies 91 and 92, and the separator 30 and the adhesive layer 42 are thermocompression-bonded to each other, and the collector plate 70 and the adhesive layer 43 are thermocompression-bonded to each other.

At this time, as shown in FIG. 9, a recess 93 is provided in the die 91, so that a region where the die 91 is not brought into contact with the separator 30 is formed. In the region where the recess 93 is formed, the separator 30 and the adhesive layer 42 are not thermocompression-bonded to each other, and thus the non-adhesion part 44 can be formed in this region.

Further, when a non-adhesion treatment is applied to at least one of the adhesive layer 42 and the separator 30, it is possible to form the region (the non-adhesion part 44) where the separator 30 and the adhesive layer 42 are not thermocompression-bonded to each other. In other words, the region (non-adhesion part 44) where the separator 30 and the adhesive layer 42 are not thermocompression-bonded to each other can be formed by applying the non-adhesion treatment to an interface where the adhesive layer 42 is brought into contact with the separator 30.

Figure 10:
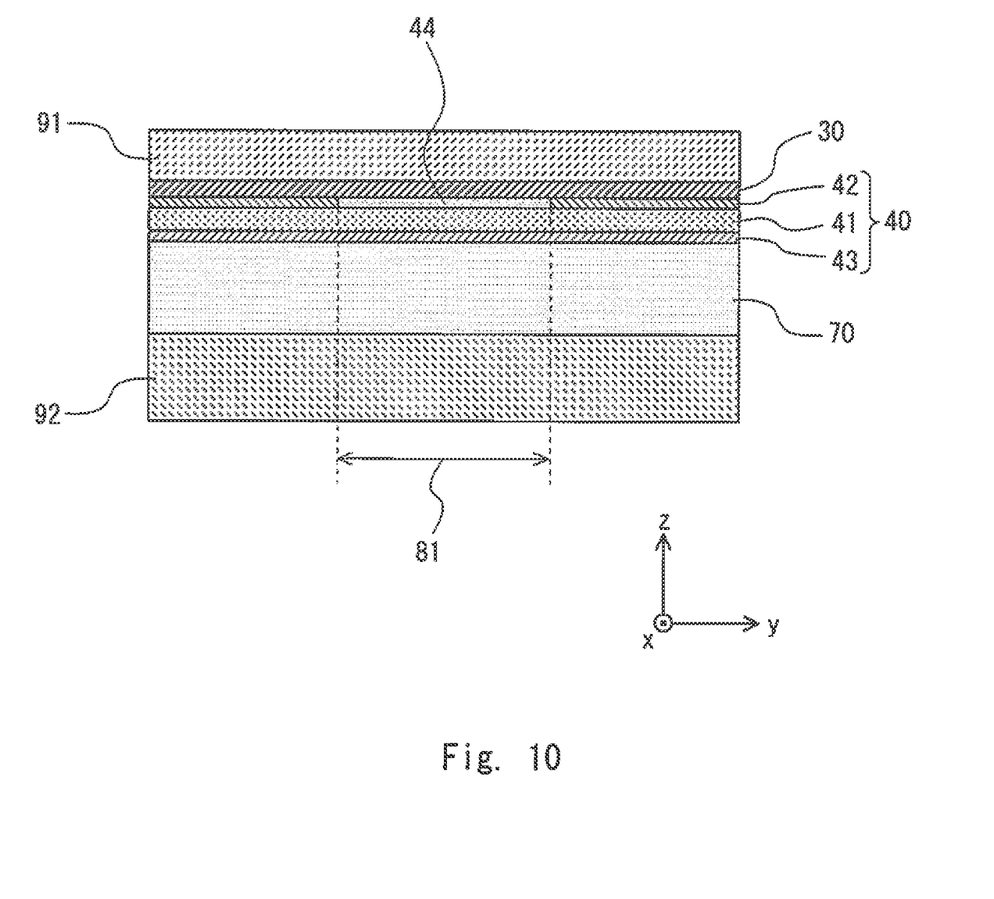
FIG. 10 is a cross-sectional view for describing the method of manufacturing the collector included in the fuel cell stack according to the embodiment.

For example, the non-adhesion treatment can be performed by applying a surfactant to the interface where the adhesive layer 42 is brought into contact with the separator 30. When the non-adhesion treatment is applied, as shown in FIG. 10, the die 91 and the separator 30 may be configured to be in contact with each other. That is, as shown in FIG. 9, it is not necessary to provide the recess 93 in the die 91.

When the non-adhesion part is formed by applying the non-adhesion treatment, the non-adhesion treatment may be applied to an interface between the adhesive layer 43 and the collector plate 70. In this case, the ventilation structure 81 can be formed between the collector plate 70 and the seal member 40.

Figure 11:
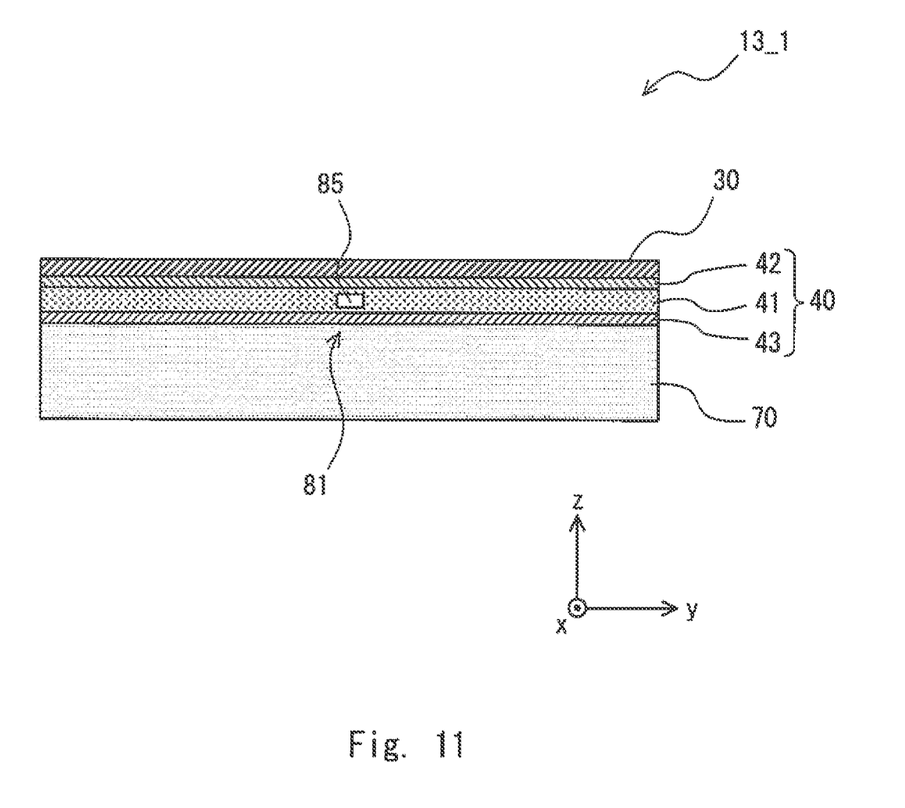
FIG. 11 is a cross-sectional view showing another configuration example of the collector included in the fuel cell stack according to the embodiment.

In the fuel cell stack according to this embodiment, like a collector 13_1 shown in FIG. 11, the ventilation structure 81 may be formed by providing a ventilation hole 85 in a part of the seal member 40. In the example shown in FIG. 1, the ventilation hole 85 is formed in the core layer 41 of the seal member 40. Alternatively, a ventilation structure may be formed by, for example, cutting out a part of the seal member 40. That is, a part of the seal member 40 may be cut out in a direction extending in the x-axis direction to form the region (the ventilation structure) where the seal member 40 is not provided between the separator 30 and the collector plate 70.

Figure 12:
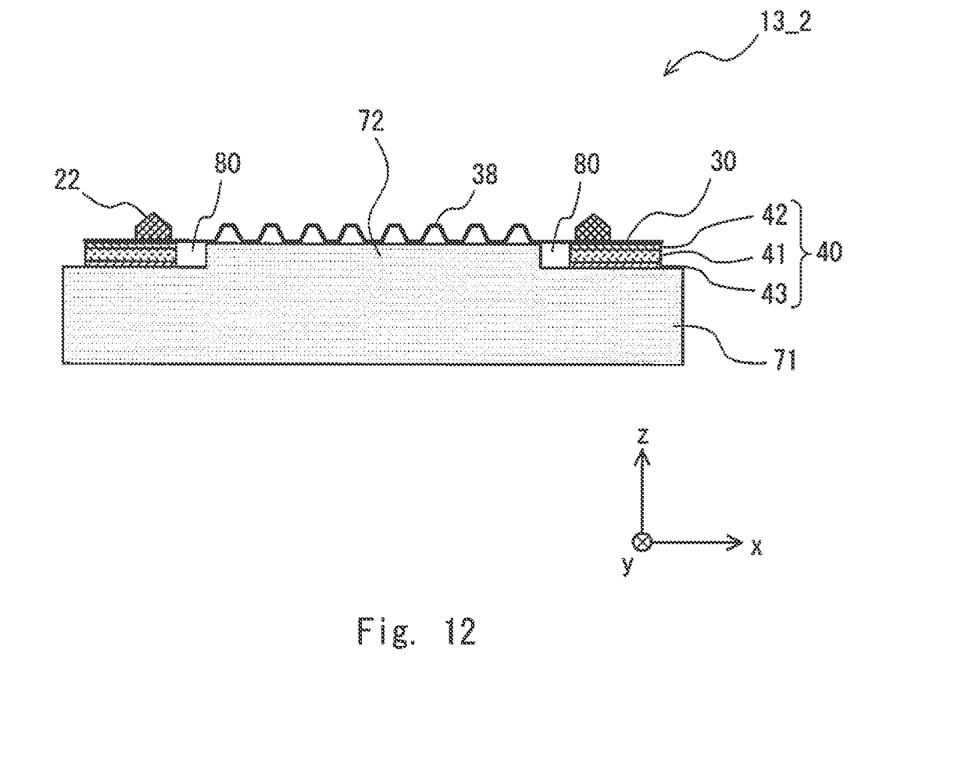
FIG. 12 is a cross-sectional view showing another configuration example of the collector included in the fuel cell stack according to the embodiment.

FIG. 12 is a cross-sectional view showing another configuration example of the collector included in the fuel cell stack according to this embodiment. In the configuration shown in FIG. 5, the thickness adjusting plate 48 for electrically connecting the separator 30 to the collector plate 70 is provided between the separator 30 and the collector plate 70. In contrast, in a collector 13_2 shown in FIG. 12, protrusions 72 are provided on the collector plate 71, so that the protrusions 72 are brought into contact with the separator 30. As the collector plate 71 is made of a metal material, the separator 30 and the collector plate 70 are electrically connected to each other when the protrusions 72 are brought into contact with the separator 30.

In the configuration shown in FIG. 12, the thickness adjusting plate 48 shown in FIG. 5 becomes unnecessary, because the protrusions 72 are configured to be brought into contact with the separator 30. This reduces the number of parts. This further eliminates the need for positioning at the time of disposing the thickness adjusting plate 48 between the separator 30 and the collector plate 70, which simplifies the manufacturing process.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A fuel cell stack comprising:
a plurality of fuel cells stacked in a stacking direction; and
a collector provided at an end part of the fuel cells in the stacking direction and configured to collect electric power generated by the fuel cells, wherein
the collector includes a structure in which a separator and a collector plate adhere to each other with a seal member interposed therebetween,
a space formed by the collector plate, the separator, and the seal member is a closed space,
the collector includes a ventilation structure for discharging gas from the closed space to the outside when a pressure in the closed space rises,
the ventilation structure is formed by providing a non-adhesion part where a part of the separator does not adhere to the seal member.

2. The fuel cell stack according to claim 1, wherein the ventilation structure is formed by providing a ventilation hole in a part of the seal member.

3. The fuel cell stack according to claim 1, wherein a thickness adjusting plate for electrically connecting the separator to the collector plate is provided between the separator and the collector plate.

4. The fuel cell stack according to claim 1, wherein the collector plate includes a protrusion protruding to be brought into contact with the separator in the stacking direction.

5. The fuel cell stack according to claim 1, wherein
the collector has a rectangular shape, and a communication hole through which anode gas and cathode gas pass through is provided in each of both end parts of the collector in a longitudinal direction, and
the ventilation structure is formed at a part of a side extending in the longitudinal direction of the collector.

\* \* \* \* \*